UNITED STATES PATENT OFFICE.

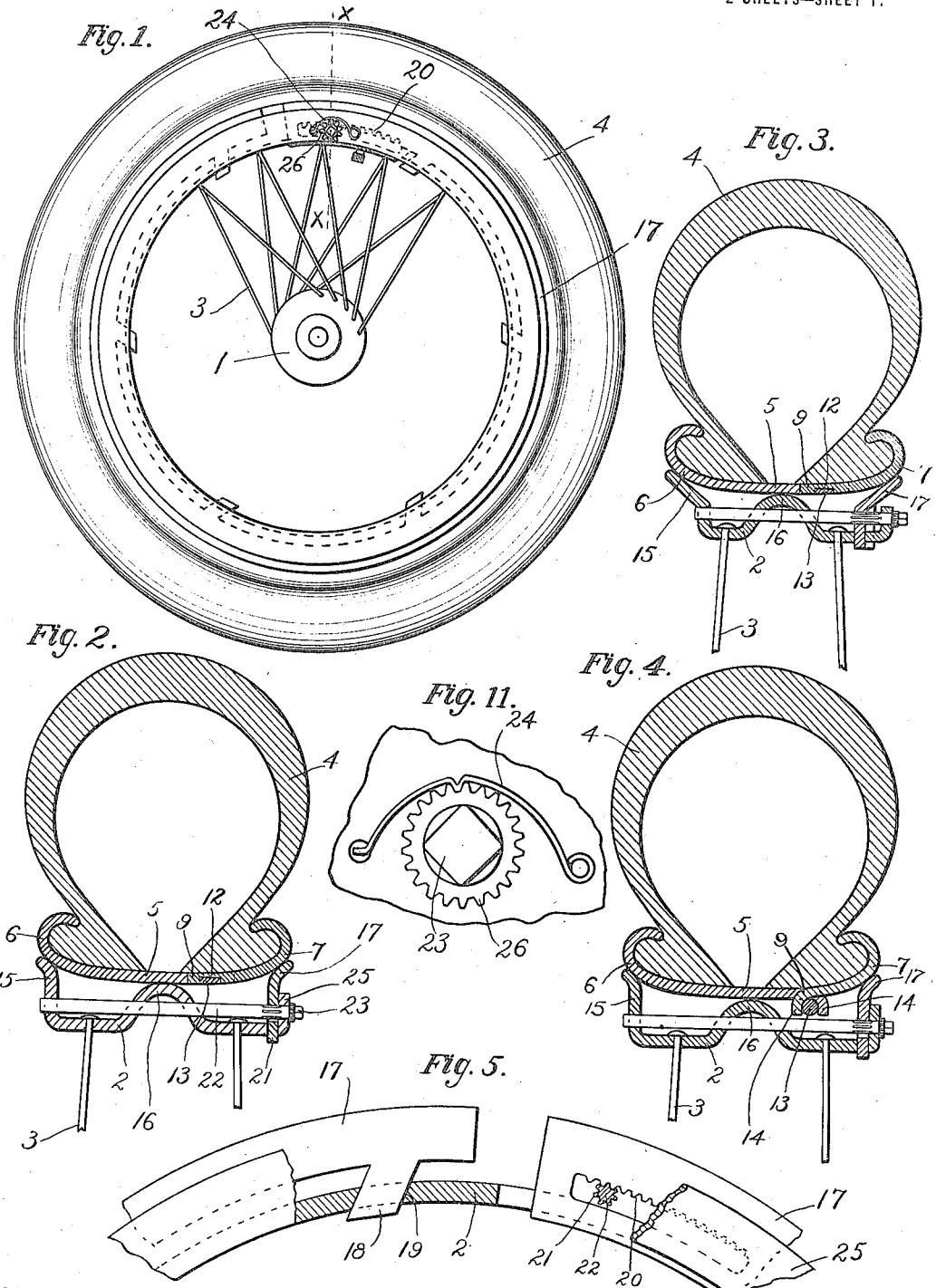

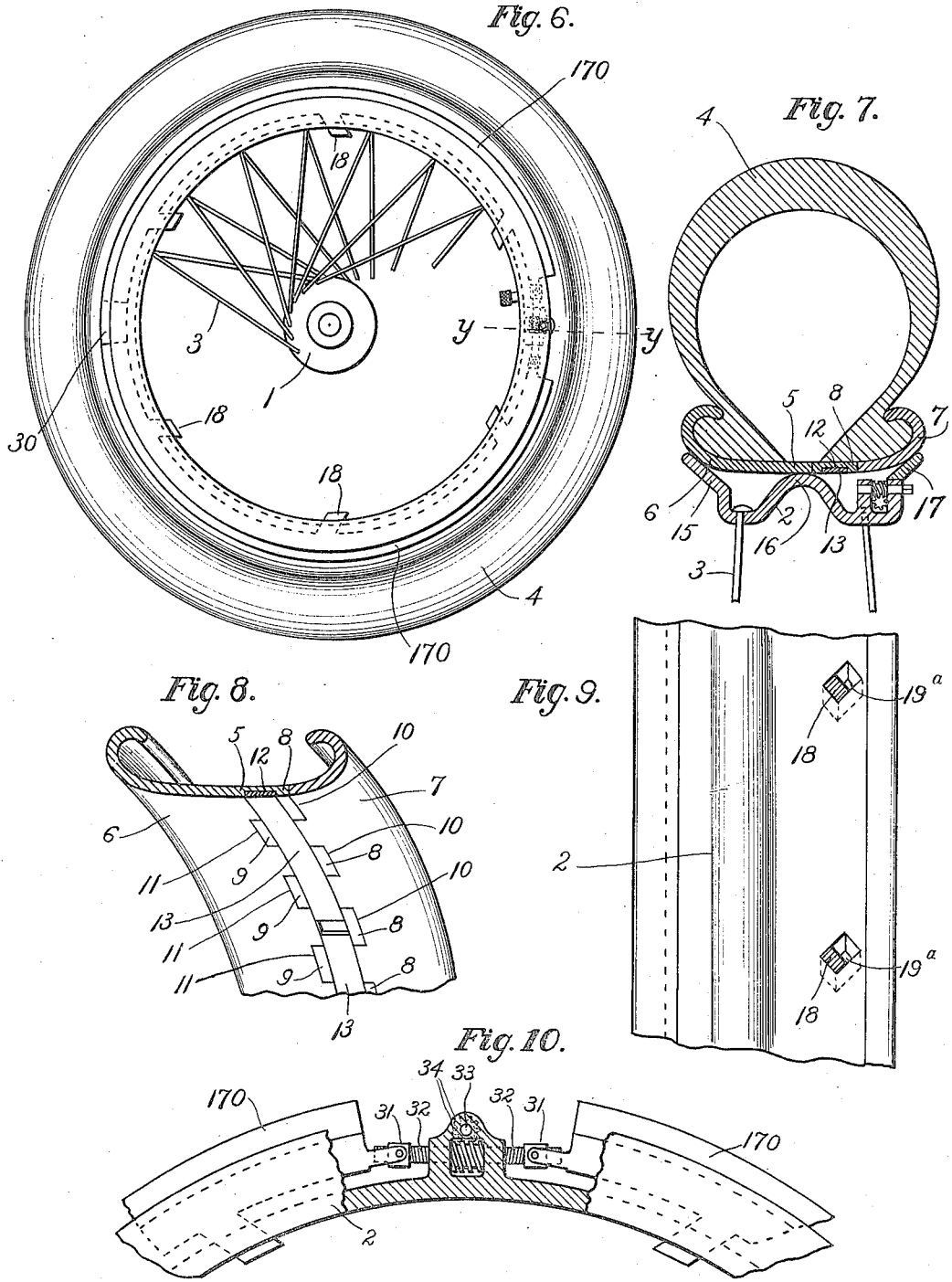

WALTER E. COPITHORN, OF NATICK, MASSACHUSETTS.

RIM FOR PNEUMATIC TIRES.

1,207,277. Specification of Letters Patent. Patented Dec. 5, 1916.

Application filed July 28, 1914. Serial No. 853,707.

*To all whom it may concern:*

Be it known that I, WALTER E. COPITHORN, a citizen of the United States, residing at Natick, county of Middlesex, State of Massachusetts, have invented an Improvement in Rims for Pneumatic Tires, of which the following description, in connection with the accompanying drawing, is a specification, like characters on the drawing representing like parts.

This invention has for its objects to provide a novel rim for pneumatic tires which is constructed to permit the tire to be quickly removed from the rim and also to provide a novel means of holding the rim on the wheel.

Some embodiments of the invention will first be described and then the novel features thereof will be pointed out in the appended claims.

In the drawings wherein I have shown some selected embodiments of my invention to illustrate the latter, Figure 1 is a side view of a wheel showing my improvements applied thereto; Fig. 2 is an enlarged section on the line $x$—$x$, Fig. 1; Figs. 3 and 4 are views similar to Fig. 2 showing modifications of my invention; Fig. 5 is a detail fragmentary view showing the manner of operating the expanding locking ring; Fig. 6 is a view similar to Fig. 1 showing a different form of my invention; Fig. 7 is a section on substantially the line $y$—$y$, Fig. 6; Fig. 8 is a fragmentary perspective view of the rim showing the manner of connecting the two rim sections; Fig. 9 is a plan view of the wheel rim shown in Fig. 3; Fig. 10 is an enlarged detail of the mechanism for operating the expanding ring illustrated in Fig. 6. Fig. 11 is an enlarged detail of the means for locking the ring-expanding gear.

In the drawings 1 indicates a wheel body which is shown more or less diagrammatically in Fig. 1 and which may have any suitable or usual construction, it being provided with any appropriate rim portion 2. In the construction shown in Figs. 1, 6, and 7 the wheel is a wire wheel, the spokes 3 thereof being made of wire and these spokes are headed into the rim portion 2.

4 designates a pneumatic tire which is sustained on the rim 5 that is demountable from the wheel body. The rim 5 is herein shown as made in two sections which can be readily disconnected from each other, thus making it of the so-called Q-D type. The two sections of the tire rim are shown at 6 and 7, respectively, each section being annular in shape and extending throughout the length of the rim. Each section has on its inner edge a plurality of projections which are spaced apart, the projections on the section 6 being designated 8 and those on the section 7 being designated 9. The size of the projections and the spacing between them is such that the projections 8 on the rim section 6 fit in the spaces 10 between the projections 9 on the rim section 7, and similarly the projections 9 on the rim section 7 fit in the spaces 11 between the projections 8 on the rim section 6. These two rim sections when placed in operative relation to each other are held in such position by means of a locking ring which is adapted to engage opposed shoulders formed on the alined projections 8 and 9, respectively. In Figs. 2, 3 and 8 these opposed shoulders are formed by making grooves 12 in the underside of the projections 8 and 9, respectively, the grooves extending transversely of the projections and circumferentially of the rim and being so situated that when the rim sections are in operative position the grooves are in alinement. The locking ring is shown at 13 and is in the form of a split band which can occupy the alined grooves 12, said band by its own resiliency holding itself in the groove and thus locking the two rim sections 6 and 7 together. In Fig. 4 I have shown a little different embodiment of the invention wherein the shoulders for engagement with the locking ring are formed by bending the ends of the projections 8 and 9 downwardly, as shown at 14, thereby to form the shoulders or abutments in which the locking ring 13 is received. This locking ring is a split ring, as above described, and it is retained in its position between the shoulders by its own resiliency. So long as the locking ring is in position the two rim sections 6 and 7 are firmly locked together, but said rim sections can be readily separated from each other by simply picking the locking ring 13 out from its groove by means of a suitable implement. The rim is thus of the "quick-detachable" type and it is also demountable from the wheel body. The rim may be either of the clencher variety, as shown in the drawings, or may have any other usual or appropriate construction for holding the tire 4 thereon.

The rim 2 of the wheel is provided at one side with a positioning flange 15 and will preferably be provided centrally with a rib or raised portion 16 to engage the under side of the rim 5, and said rim is held in place against the positioning flange 15 by means of an expanding and contracting locking ring which may be so constructed as to lock the rim in place either by an expanding or a contracting movement of the locking ring. This locking ring is provided with inclined fingers which engage apertures formed in the wheel rim 2 and which are so constructed that a circumferential movement of the locking ring will cause it to expand or contract. In the embodiment of the invention shown in Figs. 1, 2, 4 and 5, this locking ring is so constructed that it is expanded outwardly to lock the demountable rim 5 in place and can be contracted to a diameter which will permit the demountable rim to be removed over it. In Figs. 3 and 9 I have shown a construction wherein the locking ring is contracted for locking the demountable rim 5 in place and is expanded in order to remove it from the wheel rim when the demountable rim is to be removed. Furthermore, in Figs. 1 to 5, and in Fig. 7, I have shown a one-piece locking ring, while in Figs. 6 and 10 I have shown a two-piece locking ring. All of these embodiments of the invention work on the same principle, however.

Referring first to Figs. 1, 2 and 5, the locking ring is shown at 17 and it is situated inside of the upturned flange 25 formed on the wheel rim 2. Said locking ring is provided with the inclined fingers 18 which extend through slots 19 formed in the wheel rim 2. This locking ring is a one-piece split ring and it has at one end thereof rack-teeth 20 adapted to engage with teeth 21 formed on a shaft 22 that is journaled in the wheel rim, said shaft being shown as provided with a wrench-receiving portion 23. If the shaft 22 is turned in a direction to move the rack 20 to the right, Fig. 5, such movement will operate to expand the ring 17 due to the engagement of the inclined teeth 18 against the walls of the notches 19, and this expanding movement will bring the locking ring 17 hard against the inner face of the portion 7 of the demountable rim 5, thus locking the demountable rim in place. The shaft 22 is held from rotation by means of a locking pawl 24 adapted to engage teeth 26 formed on the shaft 22. To remove the demountable rim 5, the shaft 22 is turned in a direction to move the rack 20 in the direction opposite the arrow Fig. 5, which will result in contracting the locking ring 17 sufficiently to withdraw it from engagement with the demountable rim 5 and to permit the demountable rim to be withdrawn over the contracted locking ring.

In Figs. 3 and 9 I have shown an embodiment of the invention wherein the locking ring is contracted to lock the demountable rim in place, but is expanded in order to remove said demountable rim. In this embodiment of the invention the apertures 19ª in the wheel rim 2 are inclined inwardly, as best seen in Fig. 9, so that when the locking ring 17 is expanded or contracted it will have also a lateral movement. In this embodiment the contracting of the locking ring 17 draws it inwardly against the demountable rim 5, thus securely locking the latter in place. In order to remove the demountable rim, the locking ring is expanded and the expanding action will move it laterally due to the inclination of the slots 19ª and thus separate it from the demountable rim. When the locking ring has been expanded sufficiently to withdraw the fingers 18 from the slots 19ª, then said locking ring is removed, after which the demountable rim can be removed.

In Figs. 6 and 7 and 10 I have shown a construction where the locking ring is made in two parts. In this device the two locking ring sections are shown at 170, and they have inclined fingers 18 thereon, as above described, except that the fingers of one section incline oppositely to those on the other section. The two sections overlap each other at one end, as shown at 30, and at the other end have pivoted thereto nuts 31 which engage right and left hand screw-threads 32, the latter being integrally connected and operated from a transverse shaft 33 in any suitable way, as by spiral gearing 34. With this construction the two locking ring sections 170 are positively moved toward and from each other to expand or contract the locking ring, as above described.

I claim:

1. In a wheel, the combination with a wheel body having a felly band provided with openings adjacent one edge, of a demountable rim encircling said wheel body, an expansible locking ring having inclined fingers occupying said openings and adapted to engage one edge of the demountable rim and retain the latter in place, said ring having a rack at one end, and a pinion journaled on the wheel body and engaging said rack and by which the ring can be expanded or contracted.

2. In a wheel, the combination with a wheel body having a felly band provided with openings adjacent one edge, of a demountable rim encircling said wheel body, an expansible locking ring encircling the felly band and having inwardly-directed inclined fingers extending into said openings, said locking ring being constructed to engage one edge of the demountable rim and retain the latter in place, and means acting on one end of said locking ring for moving it circumferentially of the felly band, said inclined fingers causing said ring to expand when the latter is moved in one direction and to contract when moved in the opposite direction.

In testimony whereof, I have signed my name to this specification, in the presence of two subscribing witnesses.

DR. WALTER E. COPITHORN.

Witnesses:
LOUIS C. SMITH,
THOMAS J. DRUMMOND.